United States Patent [19]
Bennett

[11] 4,333,727

[45] Jun. 8, 1982

[54] COMPOSITE ROTARY TOOL INCLUDING HOLE FORMING MEANS AND A DEBURRER OR CHAMFERER

[76] Inventor: Donald C. Bennett, 2 Sullivan Way, East Brunswick, N.J. 08816

[21] Appl. No.: 835,905

[22] Filed: Sep. 23, 1977

[51] Int. Cl.³ .............................................. B23B 51/00
[52] U.S. Cl. .................................. 408/191; 408/226; 408/230
[58] Field of Search ............... 408/186, 187, 188, 189, 408/191, 192, 193, 199, 200, 201, 202, 203, 213, 225, 226, 241, 190, 230

[56] References Cited

U.S. PATENT DOCUMENTS

| 679,693 | 7/1901 | Burkhart | 408/191 |
| 1,111,410 | 9/1914 | Semon | 408/191 |
| 1,561,463 | 11/1925 | De Rochemont | 408/201 |
| 2,314,084 | 3/1943 | Fried | 408/201 X |
| 2,657,597 | 11/1953 | Pickering et al. | 408/200 |
| 2,949,618 | 8/1960 | Peyser et al. | 408/191 X |
| 3,063,312 | 11/1962 | Mueller | 408/191 |
| 3,635,573 | 1/1972 | Halpern | 408/193 X |

*Primary Examiner*—Harrison L. Hinson

[57] ABSTRACT

A composite rotary tool including a working surface extending from the leading end of the tool for forming a hole in the material being worked, and at least one cutter positioned beyond the active working surface for removing a small amount of material from an edge of a formed hole during the period of the forward and reverse strokes of the tool. The cutter may perform its function during a normal complete cycle of the tool operation.

2 Claims, 25 Drawing Figures

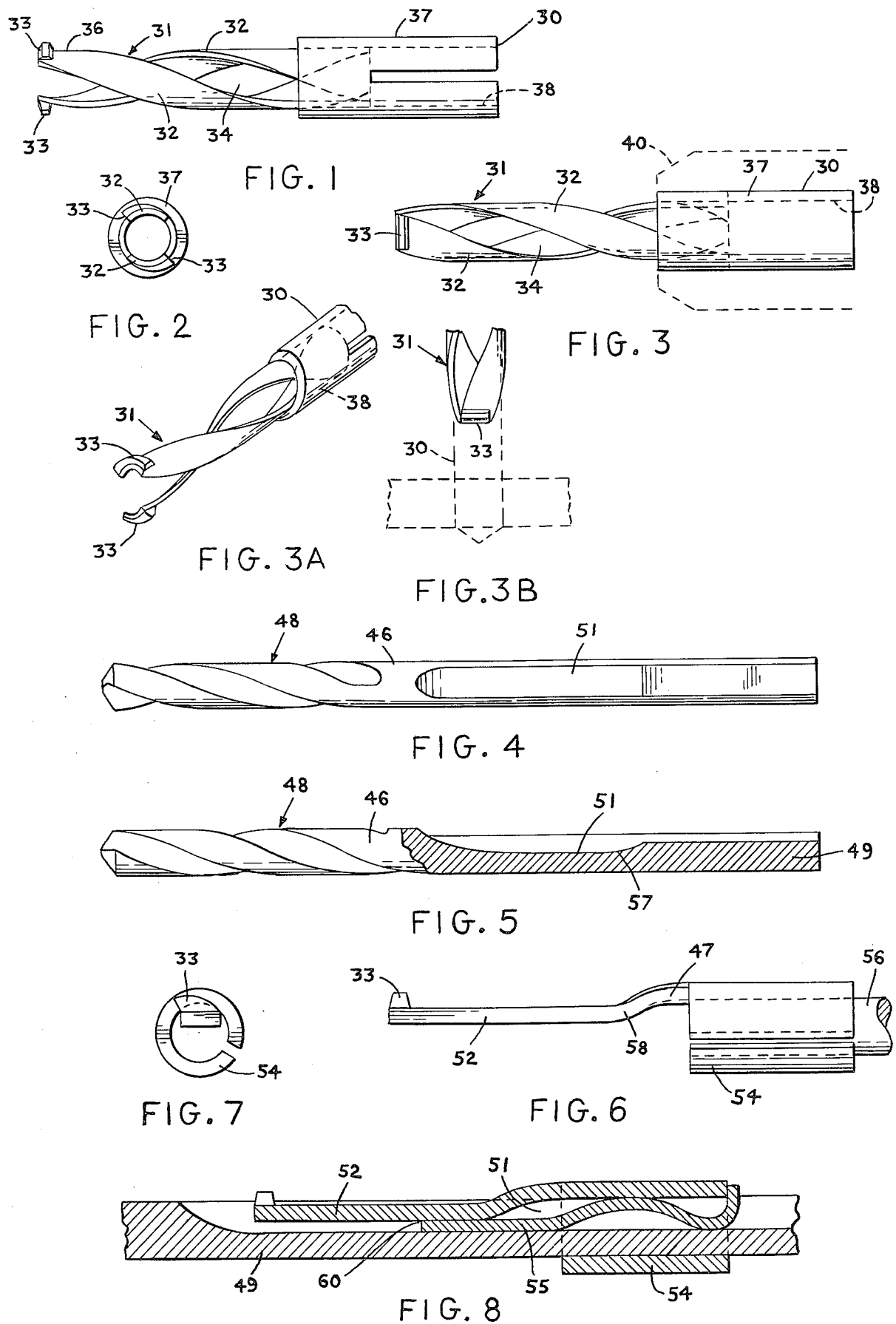

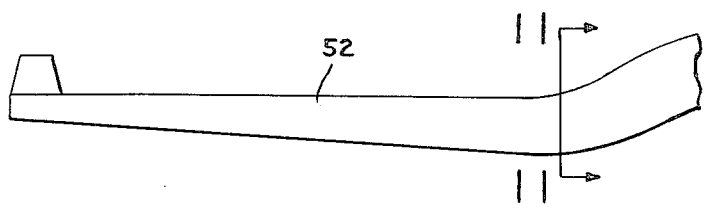 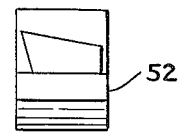 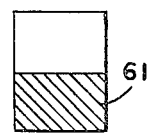
FIG. 9  FIG.10  FIG.11
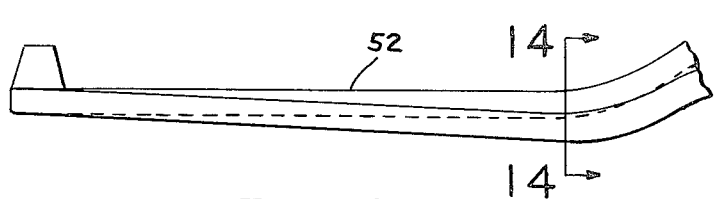 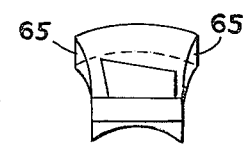 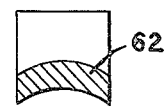
FIG.12  FIG.13  FIG.14
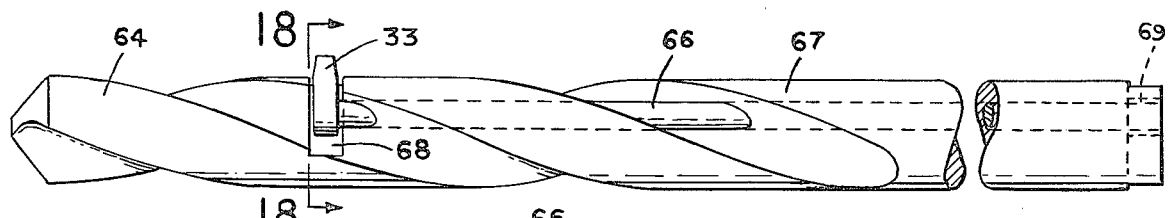
FIG.15
 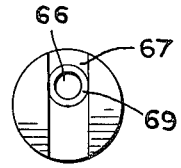 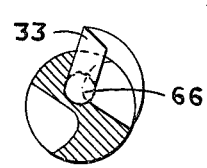
FIG.16  FIG.17  FIG.18
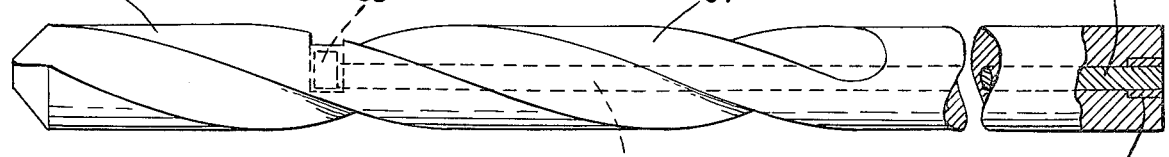
FIG.19
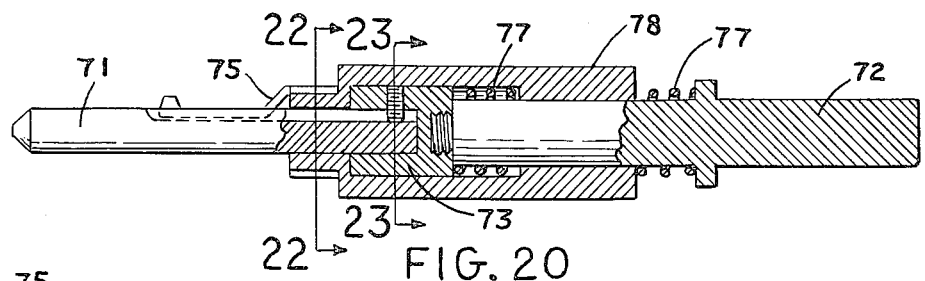
FIG.20
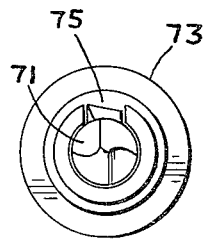 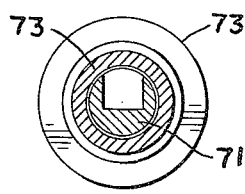 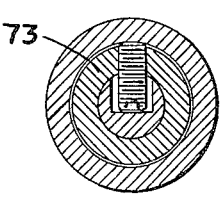
FIG.21  FIG.22  FIG.23

COMPOSITE ROTARY TOOL INCLUDING HOLE FORMING MEANS AND A DEBURRER OR CHAMFERER

BACKGROUND OF THE INVENTION

The invention relates to a composite tool including means such as a drill, for forming holes in material and means for deburring or chamferring hole edges.

In the formation of holes in metals and other materials by means of a conventional rotary cutting tool, such as a drill, tap, reamer or mill, burrs may form at the entrance and exit ends of a through hole and in the case of a blind hole at the entrance end of the hole. Removal of the burrs by means of a conventional tool is, of course, standard manufacturing practice. Chamferring the edge of a hole involves substantially the same practice except the emphasis is more on shaping or forming a bevel. In any event, each case involves the removal of a small amount of material from the edge of a formed hole. Hence, the terms deburring and chamferring are used interchangeably in the art.

As intimated above, it has been the practice to form the desired hole in a material by means of a conventional primary tool and to later remove the burrs or form a chamfer in a separate operation by means of a special or chamferring tool. Such practice is exemplified by U.S. Pat. No. 2,657,597 to Pikering et al., and U.S. Pat. No. 3,276,294 to Kubicek, each showing the subsequent use of separate deburring or chamferring tools. Each patent also shows the performance of a deburring or chamferring operation at both the entrance and exit ends of a hole by means of a single tool. It goes without saying that the prior art procedure requiring separate operations for the primary and deburring or chamferring functions is time consuming, requires additional equipment and retards production, resulting in higher manufacturing costs.

SUMMARY OF THE INVENTION

One object of the present invention is to provide a rotary tool for forming holes in a material in combination with a deburrer or chamferer for removing material from at least one end of a formed hole or opening.

Other objects and advantages will come to light including the provision of special supporting structures for the deburrer or chamferrer as the description ensues.

According to the invention there is provided a composite rotary tool including a working surface extending from the leading end of the tool for forming a hole in the material being worked, and at least one cutter positioned beyond the active working surface for removing a small amount of material from an edge of a formed hole during the period of the forward and reverse strokes of the tool. In other words, the cutter may perform its function during a normal complete cycle of the tool operation.

In preferred embodiments, the hole formed is a drill and the cutter is a deburrer or chamferrer.

Various cutter supports are also provided for locating each cutter at a desired position with respect to the active working surface of the drill.

BRIEF DESCRIPTION OF THE DRAWINGS

The invention will now be described in more detail with reference to the drawings wherein:

FIG. 1 is a longitudinal view of a rotary tool comprising an embodiment of the invention which utilizes a helical cutter support in combination with a standard drill;

FIG. 2 is an end view of the cutter;

FIG. 3 is a top plan view FIG. 1;

FIG. 3A is a perspective view of the cutter;

FIG. 3B shows schematically the location of the cutter with respect to a drill;

FIG. 4 is a top plan view of a portion of a rotary tool comprising another embodiment of the invention showing a modified drill for use in combination with a cantilever cutter support;

FIG. 5 is a longitudinal sideview of FIG. 4 partly in vertical section;

FIG. 6 is a vertical longitudinal view of a cutter support;

FIG. 7 is an end view of the cutter support;

FIG. 8 is a sectional view of a cantilever support featuring a spacer;

FIG. 9 is a longitudinal view of a cantilever support;

FIG. 10 is an end view of FIG. 9;

FIG. 11 is a cross-sectional view along lines 11—11 of FIG. 9;

FIG. 12 is a longitudinal view of a cantilever support having a curved configuration;

FIG. 13 is an end view of FIG. 12;

FIG. 14 is a cross-sectional view along lines 14—14 of FIG. 12.

FIG. 15 is a longitudinal view of another embodiment of the rotary tool directed to a modified drill in combination with a torsional cutter support;

FIG. 16 is a front cross-sectional end view of FIG. 15;

FIG. 17 is a rear end view of FIG. 15;

FIG. 18 is a cross-sectional view taken along lines 18—18 of FIG. 15;

FIG. 19 is a bottom plan view of FIG. 15 and shown partly in section;

FIG. 20 is a longitudinal view mostly in section of another embodiment of the invention which may employ a standard or modified drill with relative axial movement between the drill and the cutter support;

FIG. 21 is an end view of FIG. 20;

FIG. 22 is a cross-sectional view along line 22—22 of FIG. 20; and

FIG. 23 is a view along lines 23—23 of FIG. 20.

DESCRIPTION OF THE INVENTION

Referring now to the drawings, FIGS. 1 to 4, there will first be described an embodiment of the invention employing a standard drill 30 in combination with a helical cutter support 31.

The cutter support 31 includes two helical spring members 32, each carrying at one end a deburring cutter 33. One or more helical members 32 may be used within the contemplation of the invention. Each helical members 32 has a pitch and a width which allow it to lie snugly with a flute 34 of the drill 30 and below the outer diameter of the drill. Only a portion of the cutter 33 extends beyond the outer diameter a predetermined small distance due to flexure of the helical member 32, which may be of spring steel, outwardly at end portion 36, away from the bottom of the flute.

The helical members 32 are suitably attached to their ends, remote from the ends carrying the cutters, to the inside of a split sleeve 37 whose inside diameter 38 is large enough to accommodate the drill 30. The attachment may be made for example by welding, brazying, or riveting, etc.

The cutter support 31 is combined with the drill 30 by passing the drill point through the split end of sleeve 37 and rotating the drill to cause the helical spring members 32 to engage respective flutes 34 and spiral thereabout. The drill can be advanced to locate the cutters 33 a desired distance from the point of the drill.

If the drilled hole is to be deburred or chamferred only on the entrance side, each cutter 33 is located along the drill 30 a distance from the drill point that will cause each cutter to enter the hole a short distance when the drill is at its maximum penetration into the hole. If a through hole is to be deburred only on the far side of the hole, or on both sides, each cutter 33 is positioned along the drill to engage the workpiece when the drill point on advancement of the drill reaches the far side of the workpiece. On continued advancement of the drill each cutter exits from the far side of the hole before it is retracted. This practice is shown in FIG. 3A.

After the cutters are properly located, split sleeve 37 is clamped in the jaws of a standard drill chock 40. Alternatively, the sleeve 37 may be fastened to the drill 30 by means of a set screw extending, for example, through a slot in the sleeve.

Referring to FIG. 2, it will be seen that the cutter edge extends slightly beyond the outer diameter of the drill. As shown in FIG. 2A each cutter 33 is provided with only one cutting edge 41, where only the entrance end or exit end of a hole requires cutting. A pair of oppositely inclined cutting edges 41, with an intermediately camming surface 42, is provided where both the entrance and exit ends of a hole require cutting. This camming surface allows the cutters to move within the hole during transit without marring the wall of the hole.

FIGS. 4 to 7 illustrate a modified drill 46 adaptable to receive a cantilever cutter support 47. The drill 46 comprises the usual drill region 48 at the front end of a shank 49 which is modified to include a groove 51 extending therealong, almost to the flutes in the drill region.

The cutter support 47 comprises a cantilever spring 52 which carries a cutter 33 at its free end. The spring is of such dimensions and is shaped that it fits within the groove 51 and below the outer diameter of the drill over its active length. A portion of the cutter 33 extends slightly beyond the outer diameter of the drill. The spring 52 may be integral with, or suitably joined, to a split sleeve 54 which has inside diameter 56 just large enough to allow passage therethrough of the drill.

In order to attach the cutter support 47 to the drill 46, the spring 52 is aligned with the groove 51 of the drill and the support is carried forward as the split sleeve 54 surrounds the drill shank 50. The support is moved to a final desired position on the drill shank and the assembly is placed in a standard drill chock with the jaws bearing on the split sleeve to clamp the sleeve 54 firmly to the drill shank. Alternatively the sleeve may be fastened to the drill shank by means of a set screw. In the latter case, the sleeve would be provided with a slot to allow adjustment of the sleeve on the drill shank.

The groove 51 is deep enough in order to ensure adequate clearance for the front end of the spring 52 when the cutter moves forward into a drilled hole. A distance back from the front of the groove the depth is reduced by the slope 57. By adjusting the position of the spring 52 longitudinally toward the rear on movement of the sleeve, a bent portion 58 of the spring may climb the slope 57 to increase the stiffness of the spring. The stiffer the spring becomes by such variation, the more material is removed from the hole edge. In the case of a chamfer, therefore, various desired sized chamfers may be formed.

Another arrangement for modifying the spring tension or stiffness of cantilever spring 52 is shown in FIG. 8. In this case a spacer 55, shaped as shown, is interposed between the inside of the split sleeve 54 and the bottom of the groove 51. The spacer is cut to a length that assures the optimum chamferring action for each application by varying the fulcrum point 60 of the spring. It will be noted that spacer 55, which is of flat resilient strip material, is shaped to lie between the bottom of groove 51; then curves upwardly to engage the inside of the upper portion of sleeve 54; then curves downwardly to again engage the bottom of groove 51, and finally curls about a portion of the rear end of sleeve 54.

FIGS. 9 and 14 illustrate forms of cantilever supports designed to achieve the greatest radial chamferring force for a given defection with minimum stress in the spring 52. That disderatum is attained by shaping the spring to provide a moment of inertia about its flexure axis that decreases with distance from the support sleeve. This can be accomplished by increasing the cross-section 61 of the spring as viewed in in FIG. 11 in a direction away from the cutter 33 or by changing the cross-sectioned shape in the form of an arc 62 as viewed in FIG. 14 with an outward flare 65 on each side as viewed in FIG. 12. The described arrangements assure uniform fabrication of produce with accurate precision and prolong the life of the spring.

FIGS. 15 to 19 are directed to a modified drill 64 in combination with a torsional cutter support comprising a torsion rod 66 wherein spring forces are developed when the support is twisted. The drill 64 is modified by formation therein of a longitudinally extending hole 67 eccentric with respect to the drill flutes at the forward end of hole 67 normal to the drill axis. The hole is located in a region slightly above the depth of the hole being drilled.

The torsional rod 66 is fastened to the drill at its back end by any conventional means 69 such as a bushing which inhibits rotation of the back end of the rod. The forward or rotationally free end of the rod supports a suitably attached cutter 33 whose cutting edge extends slightly beyond the outer diameter of the drill. As the drill advances, the cutter 33 engages the work at the edge of the hole to form a chamfer. The reaction force created by such engagement causes the torsion rod to rotate clockwise as shown in FIG. 19 to bring the cutter edge below the outer diameter of the drill and the chamferring action ceases.

Referring to FIGS. 20 to 23, there will now be described a combined drill, which may be standard or modified and a chamferring tool.

The drill 71 is rigidly attached to a shaft 72 axially aligned with the drill by means of coupling member 73 which may be splined or otherwise attached to the forward end of the shaft 74. The coupling member 73 in turn is coupled to the drill, for example, by means of a set screw 77. Extending about the intercoupling of the drill 71 and shaft 74 is a sleeve 78 arranged to have limited longitudinal movement in either direction. Suitably attached to the front end of the sleeve is a cantilever spring carrying a cutter 33. The sleeve is held in a normal position by means of opposing compression springs 77 mounted as shown about shaft 72. On engagement of the cutter 33 with the work it may retract relatively to the drill 71 as the sleeve 78 moves a small amount and thus form a chamfer at a rate slower than the rate at which the hole was formed. When chamferring the far side of the hole, the cutter can withdraw at a slower rate than the drill. The difference in rate of cutting is made possible by the described arrangement permits each component of the composite tool to function at, or closer to, an optimum operation speed. While the rotary speed of the drill and the cutter is the same, the advancing and retracting strokes may be made at different rates.

Although the invention has been described in certain particular embodiments various changes may be made without escaping the spirit of the invention.

It will be understood that the primary function may be performed by other rotary tools in addition to a drill. For example, in tapping a hole burrs may form at the entrance end of the hole.

It will be understood further that the rotary tool may be power driven and part of a multi-tool unit. Attachment of the present rotary tools to power driven units and adjustment of the tool strokes may be made in a conventional manner.

What is claimed is:

1. A composite rotary tool including a drill having a front and rear end, a drill shaft at the rear end of the drill, a groove formed in the drill shaft and extending in a direction away from the rear end of the drill, a cantilever support mounted at least partially in the groove, a cutter carried by the cantilever support and extending in the direction of the drill for removing a small amount of material from an edge of a hole following the drilling operation, the cantilever support including a split ring and a cantilevered spring member supporting the cutter and means for adjusting tension of the spring member.

2. A composite rotary tool according to claim 1 wherein the spring includes a bent portion, and the groove is provided with an internally radially outwardly extending slope in a direction towards the rear end of said drill the slope being engagable by the bent portion whereby the spring tension may be adjusted by varying the portion of the bent portion on the slope.

* * * * *